United States Patent [19]

Goel

[11] Patent Number: 4,833,724
[45] Date of Patent: May 23, 1989

[54] IMAGING DEVICE

[75] Inventor: Anurag Goel, Bellflower, Calif.

[73] Assignee: Amada Engineering & Service Co., Inc., La Mirada, Calif.

[21] Appl. No.: 896,224

[22] Filed: Aug. 14, 1986

[51] Int. Cl.$^4$ .......... G06K 9/20; H01J 40/14; H04N 3/12
[52] U.S. Cl. .......... 382/65; 382/67; 358/212; 358/293; 250/578
[58] Field of Search .......... 382/65, 67; 358/50, 358/212, 293; 250/553, 578, 208

[56] References Cited

U.S. PATENT DOCUMENTS 4,691,114 9/1987 Hasegawa et al. .......... 250/578
4,707,615 11/1987 Hosaka .......... 358/212

FOREIGN PATENT DOCUMENTS 0154879 9/1984 Japan .......... 358/212
0244153 12/1985 Japan .......... 382/67
0003556 1/1986 Japan .......... 382/67
2027964 2/1980 United Kingdom .......... 382/67

Primary Examiner—James J. Groody
Assistant Examiner—Michael D. Parker
Attorney, Agent, or Firm—Wigman & Cohen

[57] ABSTRACT

An imaging device has a sensor unit body which moves over the region to be scanned in a prescribed direction, a plurality of linear imaging sensors each having a plurality of picture elements and each being mounted on the sensor unit body in a fashion so as not to generate gaps between any of the loci of motion along which the plurality of picture elements move, and a control unit connected to the linear imaging sensors so as to output the detected image signals whereby the images that are in region to be scanned are picked up.

4 Claims, 5 Drawing Sheets

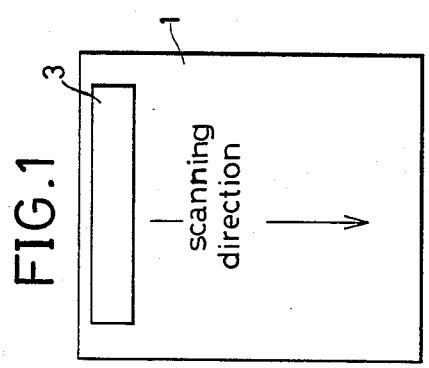
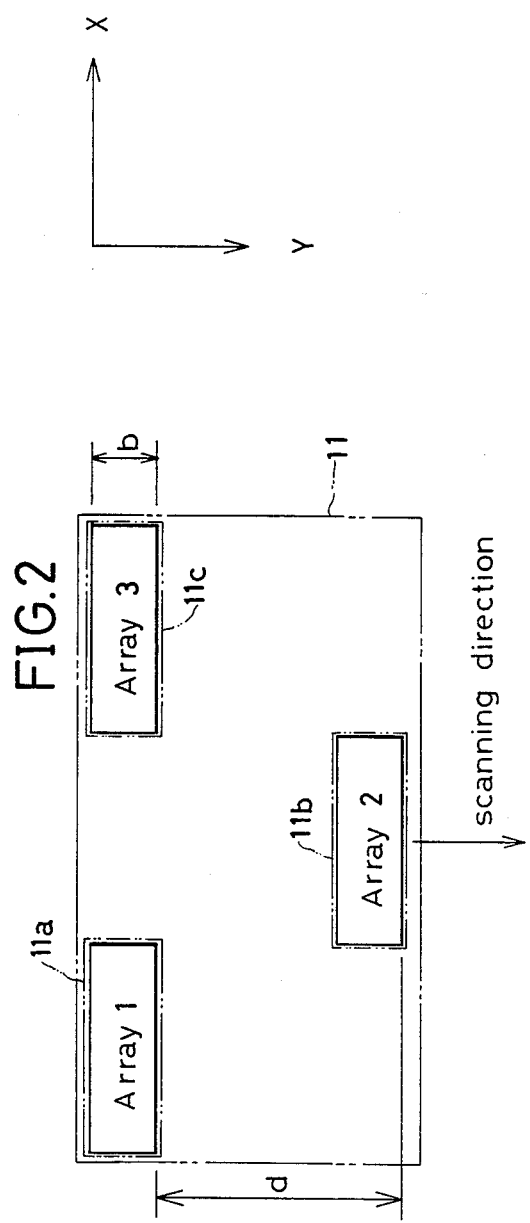

IMAGING DEVICE

BACKGROUND OF THE INVENTION

1. Field of the Invention

The present invention relates to an imaging device, and more particularly to an imaging device which has an image detection unit that consists of a plurality of linear imaging sensors.

2. Description of the Prior Art

Computer processing of digital images of engineering drawings and large two dimensional objects often requires very high resolution images over a large field-of-view. For example, digitizing of a 40"×40" engineering drawing at 200 lines per inch would require a sensor with pixel resolution of 8000×8000.

However, currently available scanning cameras have a maximum resolution of 4096×4096. This is achieved by either a CCD area sensor (which is very expensive) or by a line sensor which is stepped unidirectionally across the image plane to give the required resolution in the other direction. This is depicted in FIG. 1.

In the imaging device shown in FIG. 1, a resolution of 4096×4096 is obtained by a discrete motion across an imaging plane 1, of a linear sensor 3 that has 4096 picture elements along the longitudinal direction, in 4096 steps in the direction of the arrow.

However, with such an imaging device there is a problem that it is unable to satisfy the requirement to image a large field-of-view with very high resolution, mentioned above.

SUMMARY OF THE INVENTION

The object of the present invention is to resolve the problem that exists in the prior art device by providing an imaging device which is capable of imaging a large field-of-view with very high resolution.

In order to achieve the above object, the imaging device of the present invention is equipped with a sensor unit body that moves in a prescribed direction, a plurality of linear imaging sensors that are attached mutually related to the sensor unit body so as to have no gaps between the regions of motion (locus of motion) over which picture elements of the imaging sensors move, and a control unit which is connected to the plurality of linear image sensors for controlling the plurality of linear imaging sensors so as to let the image signals that are detected by the linear imaging sensors be output with a mutually fixed relationship.

These and other objects, features and advantages of the present invention will be more apparent from the following description of a preferred embodiment, taken in conjunction with the accompanying drawings.

BRIEF DESCRIPTION OF THE DRAWINGS

FIG. 1 shows a conventional high resolution area scanner using a linear sensor.

FIG. 2 shows an explanatory diagram for the sensor unit of an embodiment of the imaging device in accordance with the present invention.

DESCRIPTION OF THE PREFERRED EMBODIMENT

This embodiment describes a system whereby a multiple linear CCD array arranged in a staggered configuration and stepped across the image plane in one single direction, generates a continuous stream of non-interlaced raster scan information in real time. This raster scan information may be run-length-encoded or directly interfaced to the host computer. Each raster scan can be composed of 12000 or more pixels depending on physical dimensions of the CCD arrays and the imaging optics, and as many rasters per frame.

Referring to FIG. 2, in the present embodiment of the imaging device, there are provided a sensor unit body 11 that is moved in the direction of the arrow (Y-direction). On the bottom surface of the sensor unit body 11 there are provided linear imaging sensors 11a, 11b, and 11c, which are arranged alternately along the direction perpendicular to the direction of motion (X-direction). On the bottom surface (reverse side of the paper of the figure) of each of the linear imaging sensors 11a, 11b and 11c, there are provided respectively an array of picture elements Array 1, 2, 3 along the longitudinal direction of the sensors. Here, each array consists of picture elements and there are provided spaces between the right and left ends of the array of the picture elements and the right and left edges of the frame of the linear imaging sensors (After this, the array of picture elements are simply called as Array 1, 2, 3).

As is understood from FIG. 2 this proposal is similar to the state of the art shown in FIG. 1, in that the imaging linear device is swept across the image plane unidirectionally to obtain many rasters per frame. However, multiple linear arrays are used in the proposed system as shown in FIG. 2 to increase resolution in the X-direction. Since the arrays can not be arranged in a straight line right next to each other without introducing a gap along the X-direction, they are staggered along the Y-direction such that they are all perpendicular to the Y-direction and have no gap along the X-direction. This is evident from FIG. 2.

The gap d between Arrays 1 and 2 along the Y-direction is an integral multiple of the physical width b of an array. Thus, if $n = d/b$, Array 1 and 3 capture parts of an image that is n raster rows behind that captured by Array 2. To capture the whole image, the Staggered Multiple Array Configuration (SMAC) is stepped along the Y-direction in steps of one array width b across the image plane. At each new position, the Array 1, 2, 3 are electronically scanned to read the pixel data.

A continuous raster scan is created from this arrangement by delaying the pixel data output from Array 2 by n rows so as to bring it into registration with continuous output pixel data from Array 1, and 3. This is done by shifting digitized data from leading Array 2 into an (1×n) bit shift register. The controller for the implementation of this is depicted in FIG. 3.

Figure 3:
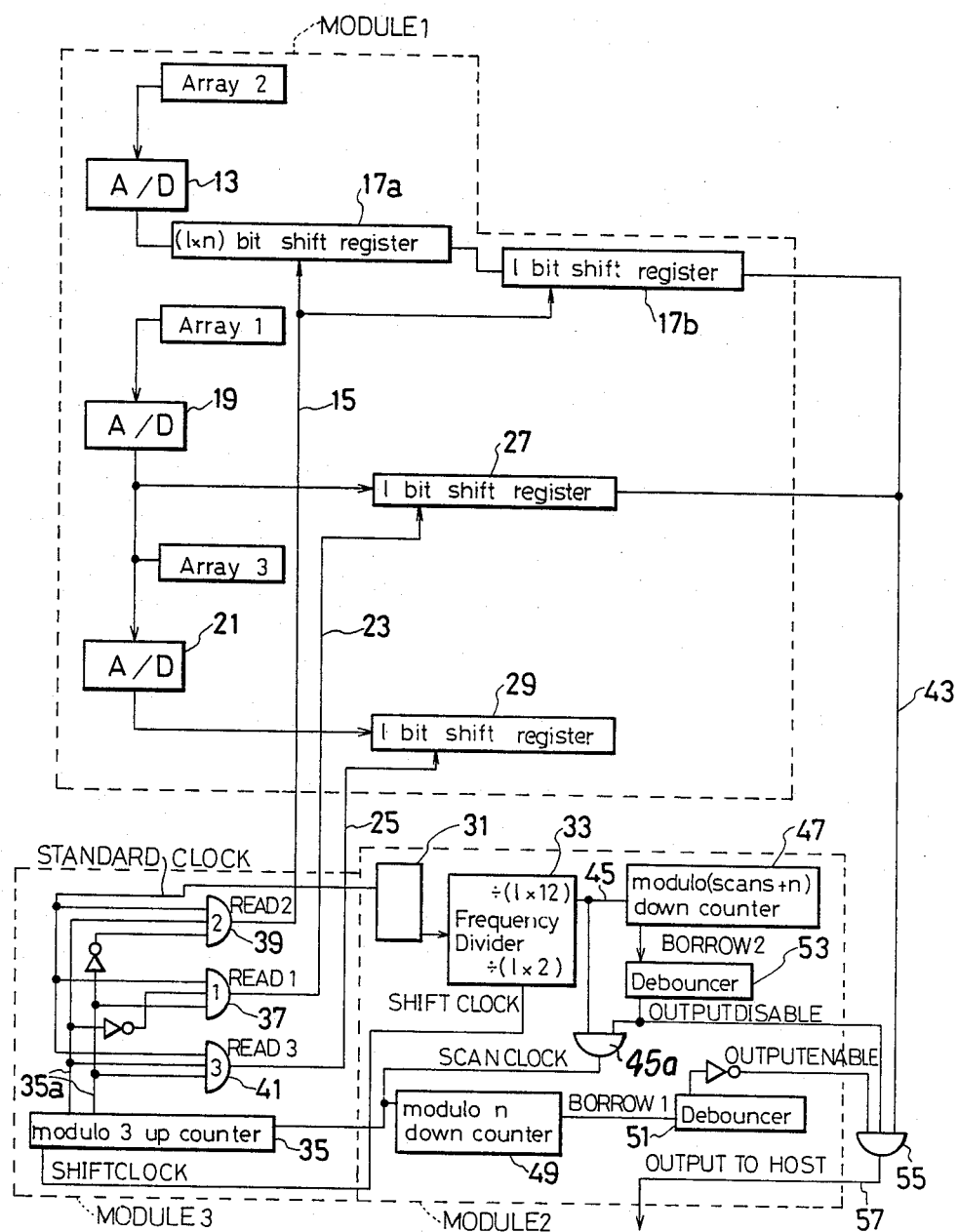
FIG. 3 shows an explanatory diagram for the control unit of the embodiment the imaging device.

FIG. 3 has been divided into three modules. MODULE 1 shows a unit comprising the three arrays of picture elements Array 1, 2, 3 and the various shift registers that are controlled by the various controlling clock signals coming in from other units of the circuit.

Figure 5:
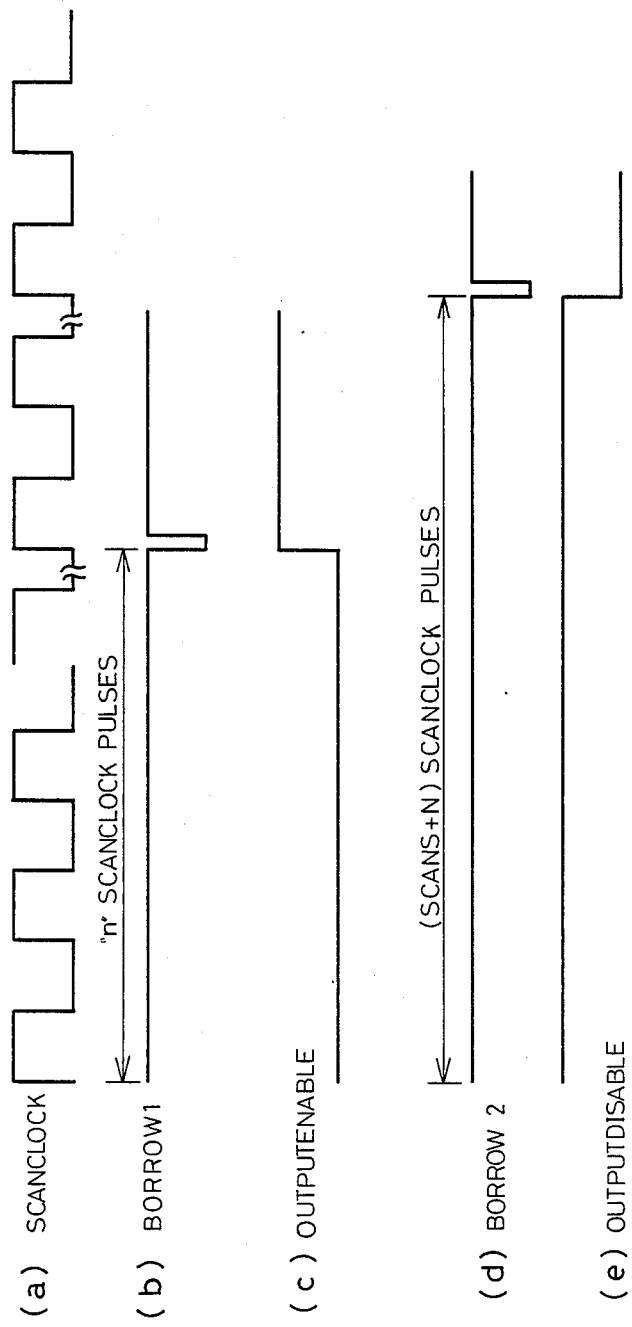
FIG. 5 shows the relationship between SCAN-CLOCK, and OUTPUTENABLE and OUTPUTDISABLE signals generated in MODULE 2 of FIG. 3.

MODULE 2 shows the unit that generates various control clock pulses from the master clock. Module 2 also comprises the element that generate "OUTPUTENABLE" and "OUTPUTDISABLE" signals to enable and disable outputs at the appropriate times, which is shown in FIG. 5. MODULE 3 shows the arrangement for generating clock signals READ 1, READ 2 and READ 3 for reading scan data from shift register 1, shift register 2 and shift register 3 in the proper sequence.

Referring to FIG. 3, FIG. 4, FIG. 5 and FIG. 6, the configuration and operation for each of the MODULE 1, 2, 3 will be described in what follows.

In MODULE 1, an image signal that is output from Array 2 via an A/D converting unit 13 is input first to the bottom stage of an $(1 \times n)$ bit shift register 17a, where $n = d/b$, as mentioned above. The imaging signal that is input to the bottom stage of the $(1 \times n)$ bit shift resister 17a is shifted successively to its higher stage parts in accodance with the command in the command signal READ 2 that is input through a signal line 15. When all the registers in the shift register 17a are filled up, these signals are input to each register of the next 1 bit shift resister 17b.

Other image signals that are output from Arrays 1 and 3 via the A/D converting units 19 and 21 are input successively to each register stage of the 1 bit shift resisters 27 and 29, based on the commands in the command signals READ 1 and 3 that are input through the signal lines 23 and 25.

Figure 4:
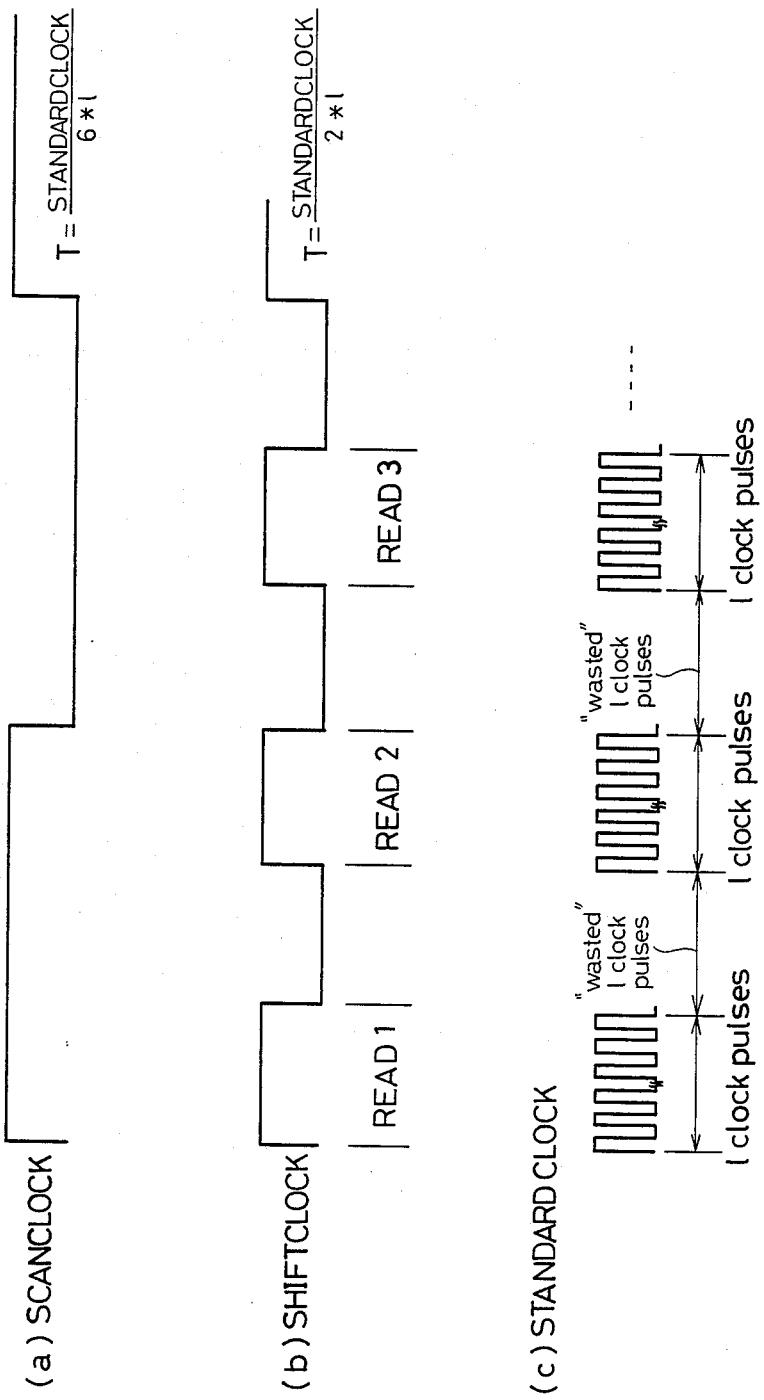
FIG. 4 shows the time period relationship between the different clocks used in the controller shown in FIG. 3.

In MODULE 2 there is provided a master clock 31 for generating the standard clock that is shown in FIG. 4. A frequency divider 33 demultiplies the frequency of the standard clock by $(1 \times 2)$ and $(1 \times 12)$ to obtain the shift clock and the scan clock, respectively, as shown in FIGS. 4 (b) and 4 (a). The former, namely, the shiftclock, regulates the timing for successively outputting the detected image signals from Arrays 1, 2 and 3, as will be described later. Further, the scanclock regulates the timing for rasters consisting of a set of image signals that are output from Arrays 1, 2 and 3 to cross the output image plane once.

In MODULE 3 there is provided a modulo 3 up counter 35 that is operated by receiving the shiftclock and the scanclock. When the shiftclock is input, the up counter 35 counts its number, and outputs a digital signal that corresponds to the counted number, to the output line 35a only when the shiftclock remains high. Moreover, when the scanclock is input, it clears the counted number.

When the digital signal that is counted and output from the up counter 35 is one, for example, the two input terminals of the AND gate 37 that are connected to the line 35a are set to H level. Further, when the counter 35 counts two, the two input terminals of the AND gate 39 that is connected to the line 35a are set to H level. Moreover, when the counter 35 counts three, the two input terminals of the AND gate 41 that is connected to the line 35a are set to H level. Consequently, when one shiftclock is input to the up counter 35, the controller will be in a state that can read the image signal from Array 1, when two shiftclocks are input to the up counter 35, it will be in a state that can read the image signal from Array 2, and when three shiftclocks are input to the up counter 35, it will be in a state that can read the image signal from Array 3.

To the remaining input terminal of the AND gates 37, 39 and 41, there is input the standard clock from the master clock 31. Accordingly, the AND gates 37, 39 and 41 output the read signals READ 1, READ 2 and READ 3 having a frequency the same as the standard clock for reading the image signals from Arrays 1, 2 and 3, respectively, with a period of the shift clock READ 1, READ 2, and READ 3, show time intervals during which "reading" of the bits in each shift register is possible. Now when the scanclock is input, the counter 35 clears the counted number. The scanclock has a period which is three times as large that of the shiftclock. Hence, when the reading of the signals from the Arrays 1, 2 and 3 is completed for once, the modulo 3 up counter is cleared and returns to its original state. By repeating this operation successively, the image signals from the Arrays 1, 2 and 3 are read one after another. Here, we note the signal from Array 2, is input to the 1 bit shift resister 17b after passing through the $(1 \times n)$ bit shift register 17a. Accordingly, the signal from Array 2 is input to the output line 43, delayed by a quantity of n clocks, in terms of the scanclock number, compared with the signals from the Arrays 1 and 3.

Figure 6:
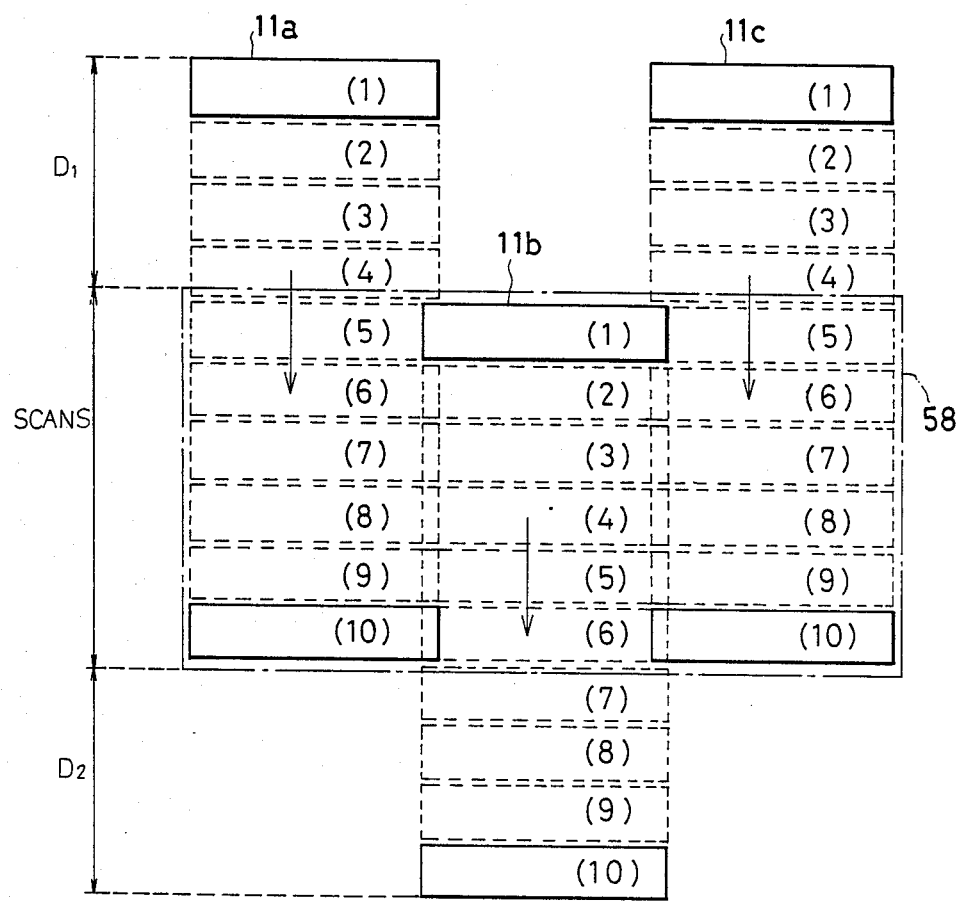
FIG. 6 shows traces of the linear imaging sensors when the sensor unit moves in a prescribed direction.

On the other hand, the scanclock generated in frequency divider 33 is also input to a modulo (scans+n) down counter 47 via a line 45 and to a modulo n down counter 49 via a line 45 and an AND gate 45a. Here, "scans" represents, as shown in FIG. 6, the length of the image plane 58 which is desired to be imaged in terms of number of steps of movement of the Arrays 1, 2 and 3. Accordingly, when n scanclocks are first input to the modulo n down counter, a trigger signal called BORROW 1 is output from the modulo n down counter 49, as shown in FIGS. 5 (a) and 5 (b), and a signal OUTPUTENABLE (see FIG. 5 (c)) is output from a debouncer 51. Further, when a number of ("scans" +n) scanclocks are input to the modulo (scans+n) down counter, a trigger signal called BORROW 2 (see FIG. 5 (d)) is output from the modulo (scans +n) down counter 47, and a signal OUTPUTDISABLE (see FIG. 5 (e)) is output from a debouncer 53. Consequently, the two input terminals of an AND gate 55 that are connected to the debouncers 51 and 53 will become simultaneously H level only for the period from n scanclocks to (scans+n) scanclocks. Because of this, therefore, the image signals, when the Arrays 1 and 3, and 2, are in the region $D_1$ and $D_2$ in FIG. 6, respectively, are neglected, and the image signals when the Arrays 1, 2 and 3 are in the region "scans" alone are output to a host computer via an output line 57.

In the above, generating SHIFTCLOCK separately to have a duty-cycle of more than 50% might be more efficient as wait time between reading of shift-registers is lesser.

The configuration shown in FIG. 2 may be extended in the X-direction by adding more staggered arrays and making appropriate changes to the driving circuit shown in FIG. 3. The number of arrays that can added is limited only by the imaging optics and the number of pixels per unit length in the array. For example, for the configuration shown in FIG. 2, assuming 1.5" length for each array and square pixels in the array, an image plane of about 4.5"×4.5" would be needed. This would depend on the ability of the optics to image a large field-of-view with minimum distortion into the image plane of the required size.

The SMAC configuration along with the suggested driving circuit can be used to provide noninterlaced grey-scale raster scan information at very high resolution for large field-of view which can be directly processed by algorithms that operate on raster-scan data in a sequential fashion in real time so as to compact the data before storage. The simplest of such an algorithm would be a thresholding and run-length-encoding algorithm which could also be implemented in hardware. Other types of algorithms that can use such information are those that interpret or image process raw data in a sequential raster scan manner. If immediate processing is not desired, the raster scan information can be stored in memory for later use. If rate of storing or processing is slower than acquisition, it can be slowed down by slowing down the stepping rate in the "Y" direction. The clock frequencies may be modified to modify the data-acquisition rate in the X-direction.

Although the invention has been described in its preferred embodiments, it is to be understood that various changes and modifications may be made within the purview of the appended claims without departing from the true scope and spirit of the invention in its broader aspects.

What is claimed is:

1. An imaging device comprising:
   a sensor unit body able to be moved in a uniaxial direction;
   a plurality of linear imaging sensors (11a, 11b, 11c) each having respectively a plurality of picture elements, said imaging sensors (11a, 11b, 11cbeing mounted on said sensor unit body in such a manner that the plurality of linear imaging sensors are arranged and oriented along a direction which is perpendicular to the direction of motion of said senor unit body, in a fashion staggered in the direction of motion, so as not to have gaps between the loci of images over which the picture elements of each linear imaging sensor move accompanying the motion of said sensor unit body; and
   a control unit connected to said plurality of linear imaging sensors, for controlling said plurality of linear imaging sensors so as to output the image signals that are detected by said plurality of linear imaging sensors,
   wherein the control unit comprises a first A/D converter means (13), connected to the first of said linear imaging sensors that is provided in a forward direction with respect to the direction of motion of said sensor unit, for changing analog signals from said first linear imaging sensor to digital signals;
   a second A/D converter means (19, 21), connected to the second of said linear imaging sensors that is provided in a backward direction with respect to the direction of motion of the senor unit body, for changing analog signals from said second linear imaging sensor to digital signals; and
   a signal delay element (17a), connected to the first A/D converter means, outputting a digital signal from the first A/D converter means in synchronization with a digital signal from the second A/D converter means.

2. The imaging device fo claim 1, wherein the signal delay element comprises an (l×n) bit shift register, where l is the number of picture elements provided on the second linear imaging sensor, and n is the distance between the first linear imaging sensor and the second linear imaging sensor divided by the physical width of the second linear imaging sensor in the direction of motion of said sensor unit body.

3. The imaging device of claim 2 wherein the first and the second linear imaging sensors both have l picture elements, and an l bit shift register is connected to the (l×n) bit shift register and the second A/D converter means.

4. An imaging device comprising:
   a sensor unit body able to be moved in a uniaxial direction;
   a plurality of linear imaging sensors (11a, 11b, 11c) each having respectively a plurality of picture elements, said imaging sensors (11a, 11b, 11c) being mounted on said sensor unit body in such a manner that the plurality of linear imaging sensors are arranged and oriented along a direction which is perpendicular to the direction of motion of said sensor unit body, in a fashion staggered in the direction of motion, so as not to have gaps between the loci of images over which the picture elements of each linear imaging sensor move accompanying the motion of said sensor unit body; and
   a control unit connected to said plurality of linear imaging sensors, for controlling said plurality of linear imaging sensors so as to output the image signals that are detected by said plurality of linear imaging sensors,
   wherein said control unit is provided with a signal delay element, which is connected to the first of said linear imaging sensors that is provided in a forward direction with respect to the direction of motion of said sensor unit body so as to have the image signal output from one linear imaging sensor synchronized with the image signal from the second of said linear imaging sensors that is provided in a backward direction with respect to the direction of motion of the sensor unit body,
   said control unit further comprises a circuit means (45, 47, 53, 45a, 49, 51, 55) which inhibits the image signal detected by the second linear imaging sensor from being output for a predetermined period from an initial reference time, said predetermined period corresponding to a time difference between the time when said one of said linear imaging sensors outputs a first image signal and the time when said another of said linear imaging sensors outputs a second image signal corresponding to said first image signal, and
   whereby the images that are in the region over which the picture elements of linear imaging sensors move can be detected.

* * * * *